United States Patent [19]

Lin

[11] Patent Number: 5,315,518

[45] Date of Patent: May 24, 1994

[54] METHOD AND APPARATUS FOR INITIALIZING ANTILOCK BRAKE CONTROL ON SPLIT COEFFICIENT SURFACE

[75] Inventor: William C. Lin, Troy, Mich.

[73] Assignee: General Motors Corporation, Detroit, Mich.

[21] Appl. No.: 712,291

[22] Filed: Jun. 10, 1991

[51] Int. Cl.$^5$ .............................................. B60T 8/58
[52] U.S. Cl. ................................ 364/426.02; 303/100; 303/103; 303/106; 303/110
[58] Field of Search ................. 364/426.01, 426.02, 364/426.03, 424.05; 180/197; 303/100, 103, 106, 109, 110, 111, 95, 96, 105

[56] References Cited

U.S. PATENT DOCUMENTS

| Re. 30,209 | 2/1980 | McNinch, Jr. et al. | 303/106 |
| 3,918,766 | 11/1975 | Klatt | 303/20 |
| 4,489,382 | 12/1984 | Jonner et al. | 303/110 |
| 4,755,948 | 7/1988 | Kade et al. | 303/100 |
| 4,881,784 | 11/1989 | Leppek | 303/100 |
| 4,991,103 | 2/1991 | Lin | 303/100 |
| 5,001,636 | 3/1991 | Shiraishi et al. | 364/424.05 |
| 5,058,018 | 10/1991 | Kuwana et al. | 364/426.02 |
| 5,063,514 | 11/1991 | Headley et al. | 364/426.02 |
| 5,134,352 | 7/1992 | Matsumoto et al. | 364/426.02 |
| 5,150,298 | 9/1992 | Fujioka et al. | 364/426.02 |
| 5,206,808 | 4/1993 | Inoue et al. | 303/100 |
| 5,224,765 | 7/1993 | Matsuda | 180/197 |

*Primary Examiner*—Gary Chin
*Attorney, Agent, or Firm*—Howard N. Conkey

[57] ABSTRACT

An antilock brake control system having independently controlled left and right brakes has a control program effective at the onset of antilock operation for sensing when the vehicle is braking on a split coefficient surface and for preventing excessive yaw rate by assessing the yaw rate tendency, and when the tendency is excessive, dumping the pressure on the high coefficient side wheel and forcing that wheel into antilock modulation, thereby initializing the system to contain the yaw rate to an acceptable value.

2 Claims, 7 Drawing Sheets

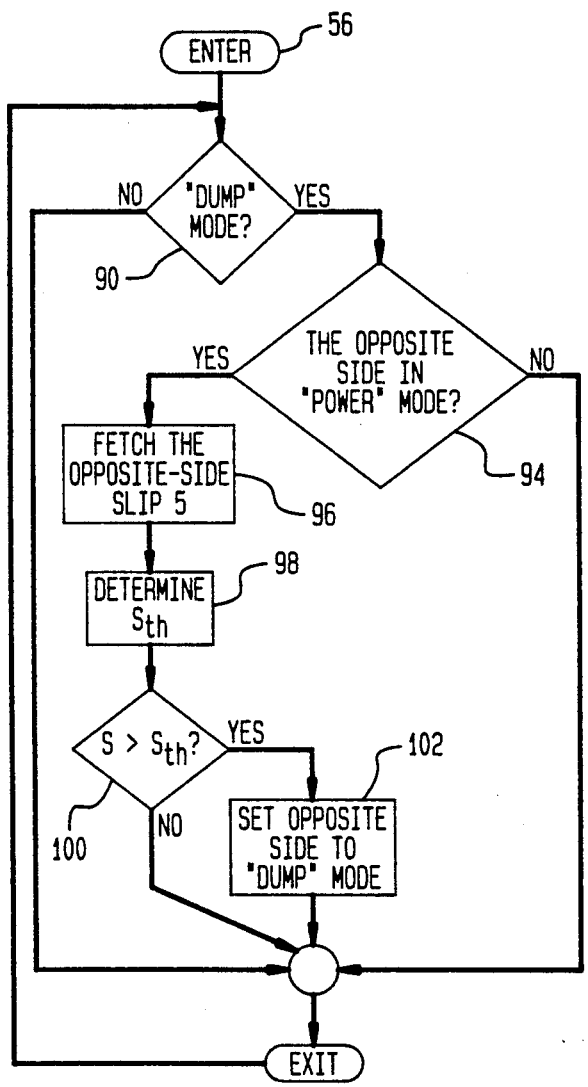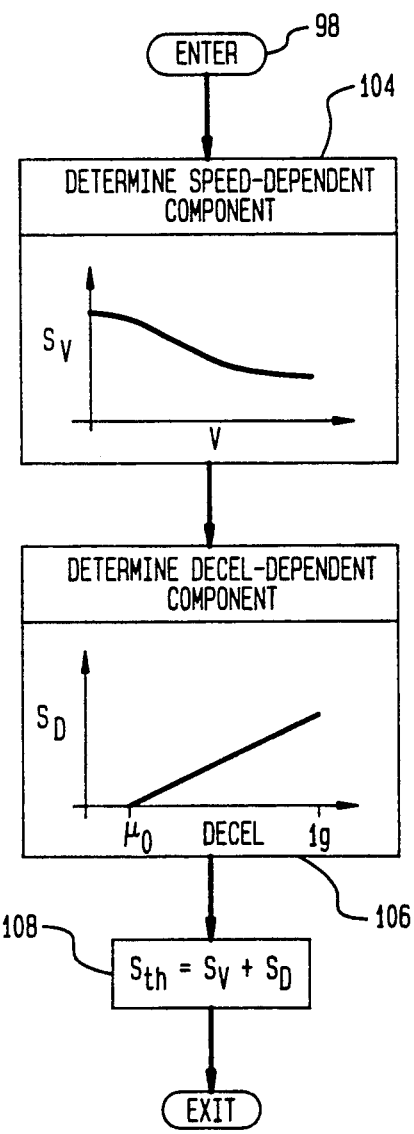

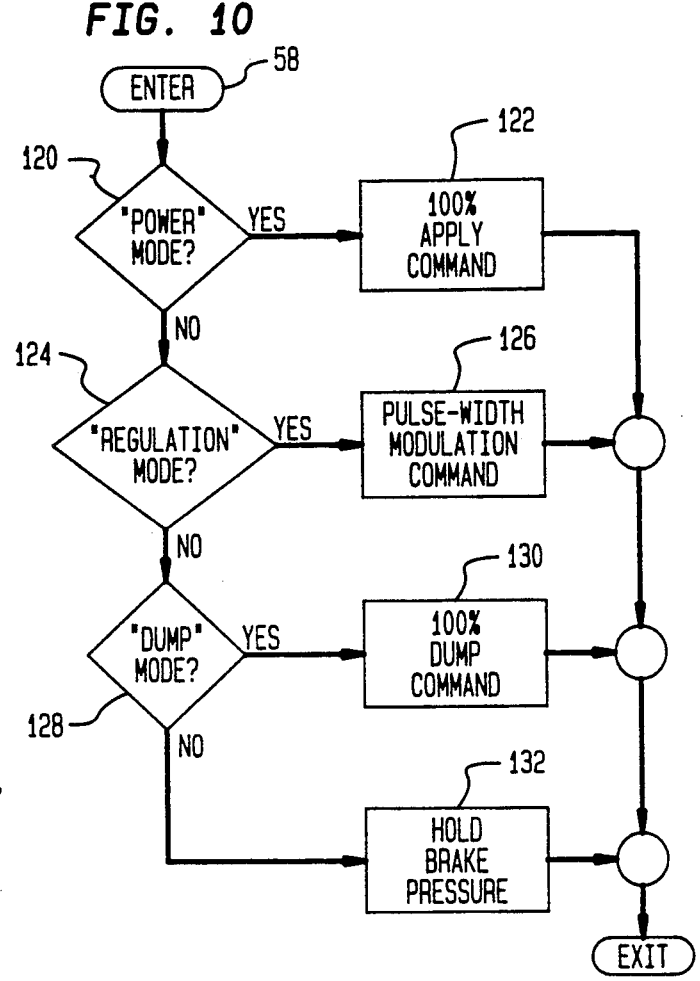
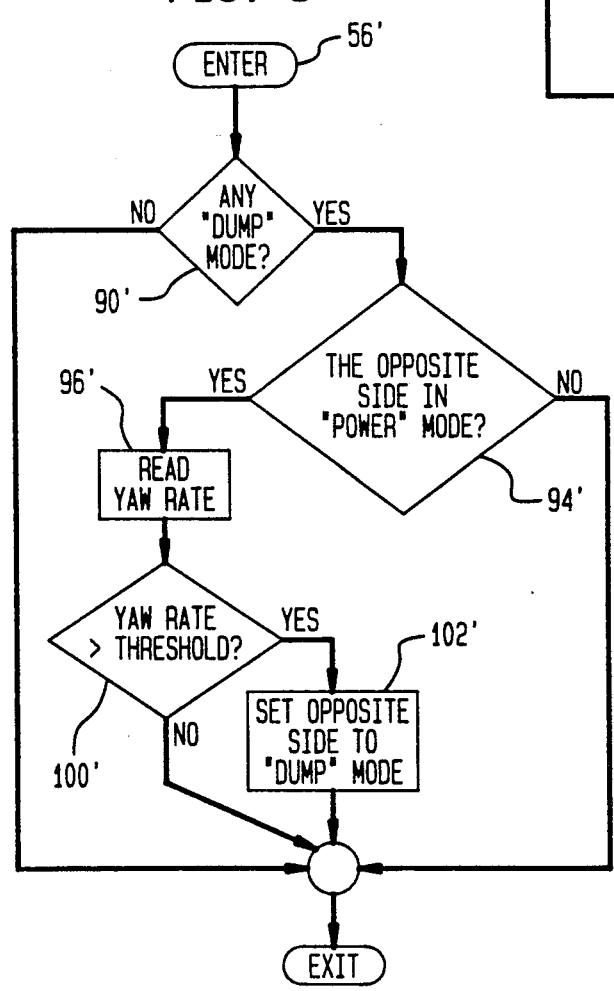
FIG. 10
FIG. 9

METHOD AND APPARATUS FOR INITIALIZING ANTILOCK BRAKE CONTROL ON SPLIT COEFFICIENT SURFACE

FIELD OF THE INVENTION

This invention relates to a wheel lock control method and system particularly for use on split coefficient surfaces.

BACKGROUND OF THE INVENTION

When the brakes of a vehicle are applied, a braking force between the wheel and the road surface is generated that is dependent upon various parameters including the road surface conditions and the amount of slip between the wheel and the road surface. The braking force increases as slip increases, until a critical value of slip is surpassed. Beyond this critical slip value, the braking force decreases and the wheel rapidly approaches lockup. If the wheel is allowed to lock, unstable braking occurs, and vehicle stopping distance on uniform nondeformable surfaces increases. Thus, stable vehicle braking occurs when wheel slip does not exceed this critical slip value. An antilock control system achieves stable braking and minimizes stopping distance by detecting incipient wheel lock. Criteria used to sense incipient wheel lock are excessive wheel deceleration and/or excessive wheel slip. Once an incipient wheel lock has been detected, pressure is relieved at the wheel brake. Upon releasing the brake pressure, the wheel will begin to recover from the incipient wheel lock condition. When the wheel has substantially recovered, brake pressure is reapplied. One criterion that is typically used to indicate wheel recovery is a positive wheel acceleration. Reapplication of brake pressure results in the wheel again approaching lockup and the wheel cycle process is repeated. Brake force and vehicle braking efficiency are maximized during braking by cycling the brake pressure around an optimum pressure for the particular road surface. The optimum pressure corresponds to the brake force generated while at the critical wheel slip value. Since the brake force is a function of wheel brake pressure and road surface conditions, the optimum brake force and the corresponding optimum brake pressure will change as road surface conditions vary. To optimize vehicle braking during a stop on a changing or non-uniform road surface, the antilock control system must be able to respond to each road surface and seek a new optimal pressure quickly to insure maximum braking efficiency. The U.S. Pat. No. 4,881,784 issued to Leppek discloses an example of such a system and is incorporated herein by reference.

When vehicle braking occurs on a road surface which has one coefficient of friction on one side of the vehicle and a markedly different coefficient on the other side, the surface is said to have a split coefficient. An example of this is a road which is covered with ice or snow along one side and is clear or dry near the center so that the right side wheels engage a low coefficient of friction and the left side wheels engage a high coefficient. The result of braking on such a surface is that the vehicle tends to yaw toward the high coefficient side. Most wheel lock control systems are designed to deal with the split coefficient surface in either of two ways if left and right wheels can be separately controlled. One approach is to independently control the brakes according to the optimum operation on each side. The result is that yaw occurs but stopping distance is minimized. The other approach is to control the brakes according to the optimum operation on the low coefficient side for a programmed period of time and then gradually resume independent brake control. This forces both brakes to have the same low pressure initially and increases vehicle stability but also increases the stopping distance.

SUMMARY OF THE INVENTION

It is therefore an object of the invention to provide a method of brake control for split coefficient surfaces which initializes the system to limit yaw rate while retaining a short stopping distance. Another object is to provide a wheel lock control system for carrying out such a method.

The invention is carried out in an antilock brake control having independently controlled left and right wheels subject to causing vehicle yaw rate on a split coefficient surface, and having for each wheel a power mode for full brake application, a regulation mode for modulated application and a dump mode for brake release; by the method of initializing the control for split coefficient surfaces comprising the steps of: sensing the presence of split coefficient surface during braking by determining when one wheel is in dump mode and the opposite wheel is in power mode; then assessing the tendency for yaw rate to exceed an undesirable amount for setting a yaw rate indication, setting the said opposite wheel to dump mode in response to a yaw rate indication, and subsequently terminating the dump mode for the said opposite wheel upon recovery thereof, whereby undesirable yaw is avoided.

The invention is further carried out by apparatus for executing such a method.

BRIEF DESCRIPTION OF THE DRAWINGS

The above and other advantages of the invention will become more apparent from the following description taken in conjunction with the accompanying drawings wherein like references refer to like parts

FIGS. 3 through 6 and 8 through 10 are flowcharts detailing the operation of the electronic controller, according to the invention.

DESCRIPTION OF THE INVENTION

The ensuing description is directed to a method and system for independently controlling the left and right wheels on a given axle to achieve the desired yaw control on split coefficient surfaces. The illustrated example depicts a vehicle with independent brake control for each wheel. The system requires at least a pair of right and left wheels be independently controlled while the other pair may have a common control. While a separate modulator is provided for each of the pair of wheels so that different pressures can be applied to each wheel, an algorithm is used to initially coordinate the modulator pressures thereby limiting the independence in a manner to manage the yaw rate of the vehicle. Two embodiments are described: one requires a yaw rate sensor to provide information used in initially coordinating the modulator pressures and the other requires no such sensor.

Figure 1:
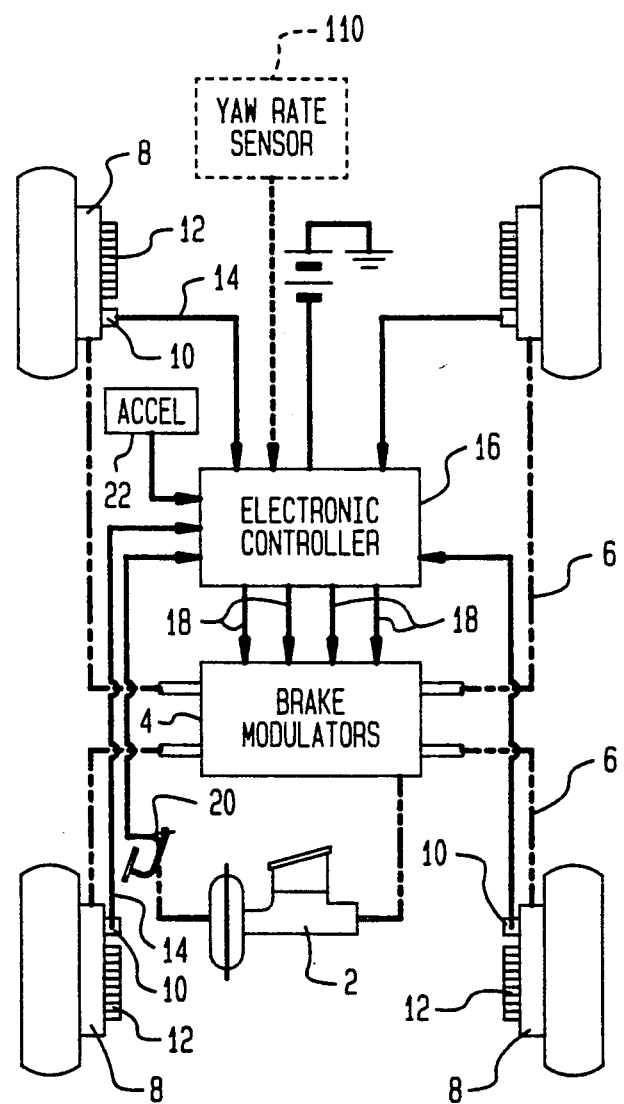
FIG. 1 is a schematic diagram of an antilock braking system according to the invention.

FIG. 1 illustrates the vehicle brake system. A hydraulic boost unit 2 couples master-cylinder pressure to brake modulators 4 which SUPPLY brake pressure via brake lines 6 to each wheel brake 8. The construction and operation of the modulators is more clearly set forth in the above-mentioned U.S. Pat. No. 4,881,784. Each modulator has an electric motor which controls a piston for regulating the brake pressure during antilock operation. To assure no piston movement and thus a constant pressure during hold mode, an electromagnetic brake on the motor may be provided as shown in U.S. application Ser. No. 352,971 filed May 17, 1989 and assigned to the assignee of this invention, and which is incorporated herein by reference. A wheel speed sensor 10 on each brake adjacent a tone wheel 12 is connected by conductors 14 to an electronic controller 16 which is programmed to supply a modulator control signal via conductors 18 to each of the modulators 4. A discrete brake application sensor 20 such as a switch responsive to brake pedal movement and a vehicle accelerometer 22 also provide input signals to the controller 16. The modulators 4, under control of the controller 16, have four operational modes: a "power" mode in which 100% of the master cylinder pressure is transferred to brake pressure, a "dump" mode in which brake pressure is relieved to reduce braking effort, a "regulation" mode which controls brake pressure at a modulated rate, and a "hold" mode which maintains existing brake pressure at a constant value but not to exceed the master-cylinder pressure.

The controller 16 monitors the wheel speed and calculates wheel slip and wheel deceleration for each wheel. Upon detecting high wheel slip or deceleration indicative of an incipient wheel lock condition, the controller 16 initiates antilock activity for that wheel by commanding the corresponding modulator to dump mode. As the brake pressure for that wheel decreases the wheel is allowed to recover as indicated by wheel acceleration. Then the regulation mode is commanded and the pressure is gradually increased toward the optimal pressure for that road surface. When such optimal pressure is exceeded the incipient wheel lock is again detected and the wheel cycle is repeated.

Figure 2:
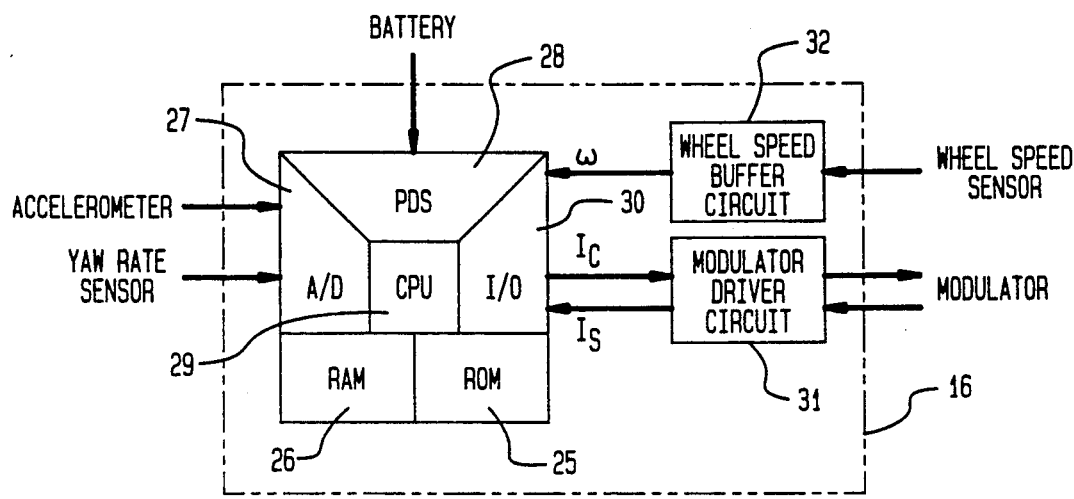
FIG. 2 is a diagram of the electronic controller.

As shown in FIG. 2, the electronic controller 16 consists of a common digital computer composed of a read-only memory (ROM) 25, a random access memory (RAM) 26, an analog-to-digital conversion port (A/D) 27, a power supply device 28, an instruction processing architecture embodied in a central processing unit (CPU) 29, and input/output (I/O) ports 30 which interface to a modulator driver circuit 31 and a wheel speed sensor buffer circuit 32. The modulator driver circuit 31 receives control commands and also feeds back brake pressure information to the ports 30. The A/D 27 accepts input signals from the accelerometer 22 and an optional yaw rate sensor 110.

The ROM 25 contains the instructions necessary to implement the algorithm diagrammed in FIGS. 3-6 and 8-10. In describing the functions of the algorithm, references to tasks which have been detailed in flow diagram function blocks are designated by <nn>, where nn is the block reference number.

Figure 3:
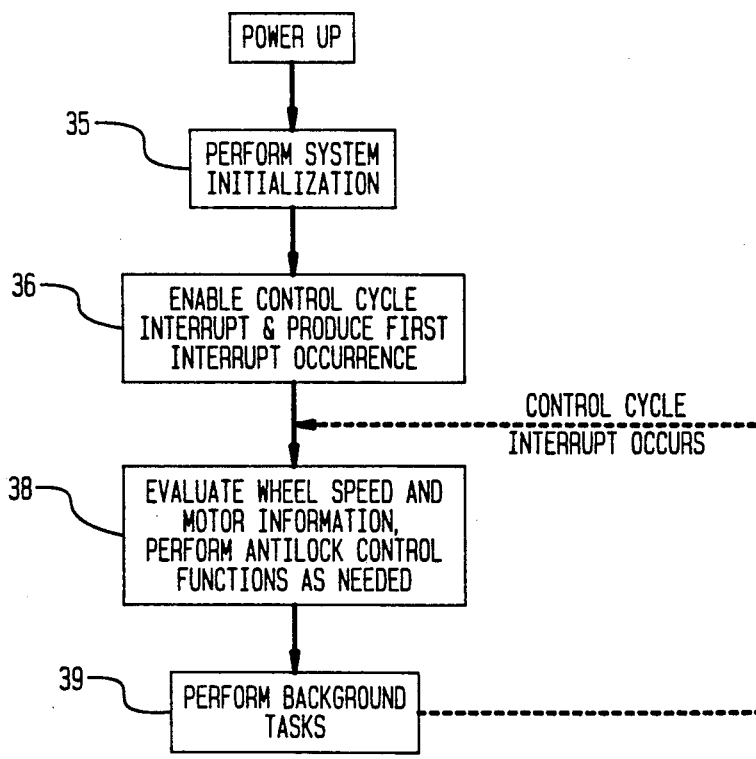

When the antilock system is powered up, via the vehicle ignition circuit or other means, the controller 16 will begin executing the instructions coded in ROM 25. As shown in FIG. 3, the controller 16 will first perform system initialization <35>, which entails clearing registers, initializing specified RAm variables to calibrated values, stabilizing voltage levels at the A/D, and other basic functions of the digital computer. The system initialization process also includes insuring the modulators are in the power mode to facilitate brake pressure control directly by the booster unit 2 until antilock functions are invoked.

Once the system has been initialized, the controller 16 will enable the control cycle interrupt <36>. The control cycle interrupt provides a means for accurately calculating the critical vehicle parameters of wheel slip and acceleration by insuring that the time between calculations is fixed at a value such as 8 msec. Once a control cycle interrupt has occurred, the controller 16 proceeds through the major loop referred to as the "control cycle". During the control cycle, the controller performs brake control processing tasks <38> for each wheel and then background tasks <39>. The brake control tasks include: reading and processing the wheel speed and pressure feedback information, determining whether antilock control is necessary, and performing antilock control functions as necessary. The background tasks consist of diagnostic self-check activities and communication with other vehicle controllers or service tools. All of these control cycle tasks are performed once every control cycle interrupt.

Figure 4:
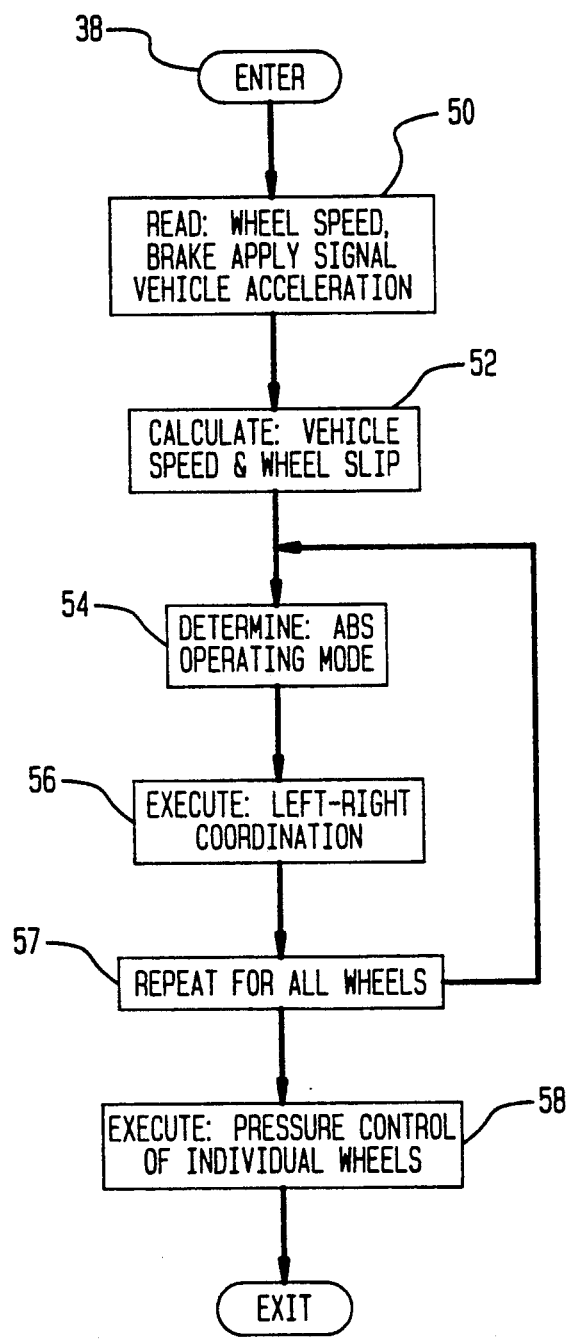

FIG. 4 is a flow diagram of the antilock brake control algorithm of block 38. It comprises reading input information <50> such as wheel speed sensor output, the brake apply signal and the vehicle accelerometer output, then calculating from the input information vehicle speed and wheel slip <52>, determining the brake operation mode <54>, executing the initial left-and-right coordination that strikes the balance between the stopping distance and initial yaw rate when braking on split-coefficient surfaces <56>, repeating the mode determination and initial coordination for all wheels <57>, and finally executing the pressure control for each wheel according to the respective operating mode <58>.

Figure 5:
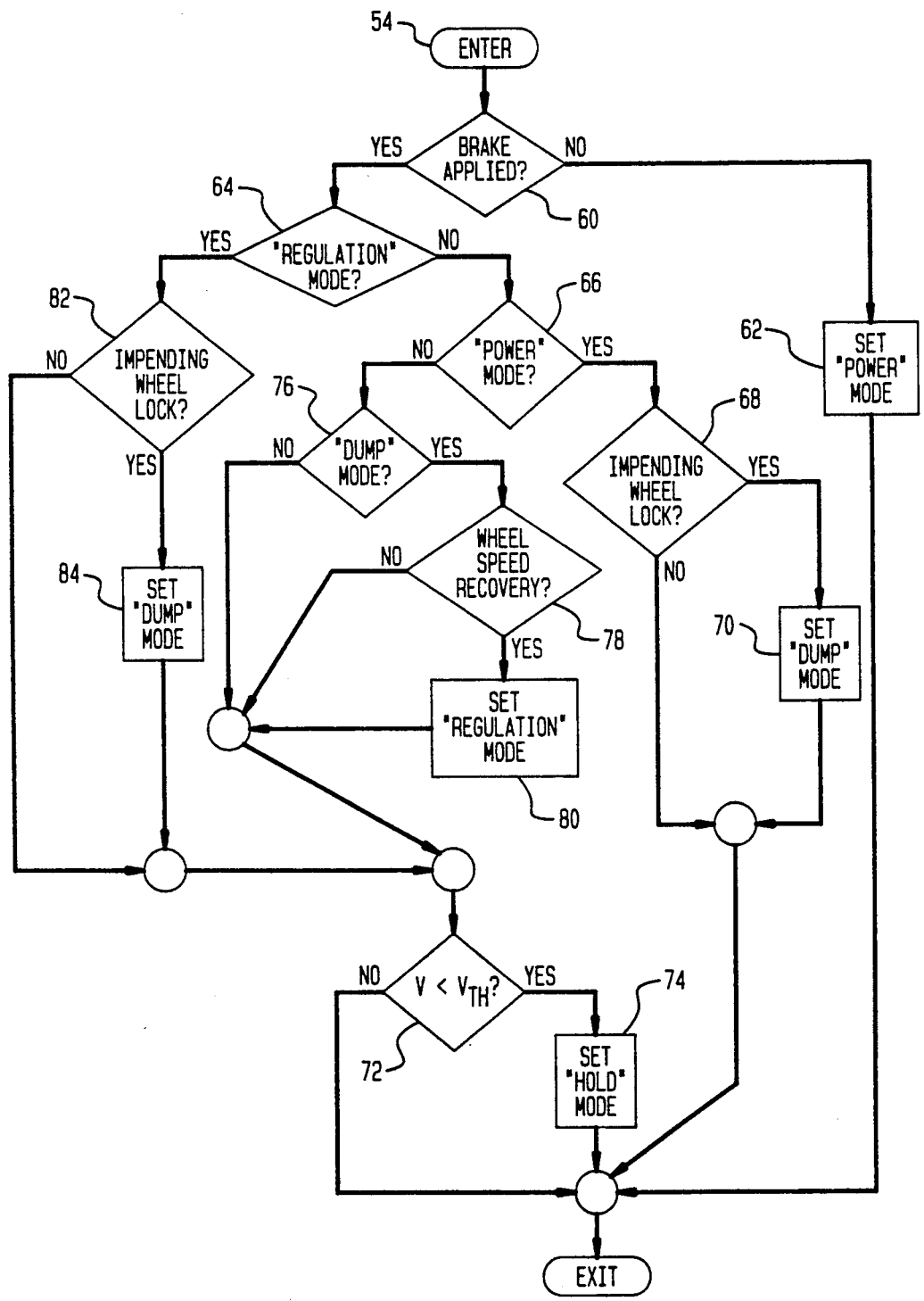

FIG. 5 sets forth the details of block 54 which determines the brake operation mode. Power mode is available for power assisted braking, dump mode for brake pressure relief during antilock braking, regulation mode for regulating wheel slips to desired targets, and hold mode to hold the brake pressure not to exceed the master-cylinder pressure generated by the brake pedal force and the hydraulic boost. The four modes are mutually exclusive and a flag is set to indicate the current mode for each wheel. If the brake is not applied <60> the power mode is set <62> for full braking pressure. If the brake is applied <60> and the regulation mode is not set <64> and the power mode is still set <66>, a test is made for impending lock <68> based on wheel deceleration or wheel slip. If there is impending wheel lock the dump mode is set <70> and, in either case, the program exits. If the power mode is not set <66> and the dump mode is not set <76>, the control passes to block 72. Where the vehicle speed is below some low threshold, say 5 mph <72>, the hold mode is set <74> to sustain the existing brake pressure. If the dump mode is set <76> and wheel speed recovery is detected <78>, regulation mode is set <80> to effect a controlled pressure increase and the control passes to block 72. When the control is in regulation mode <64> so that the pressure is increasing, impending wheel lock is tested <82> and if it is affirmed the dump mode is set <84> to reduce the brake pressure to induce wheel recovery. Again the control goes to block 72 when dump mode is set or if there is no impending wheel lock <82>. The program 54 is exited when the flags have been set for each of the wheels <63>, and then the left-right coordination program 56 is entered. Thus, in general the power mode is set when the brakes are not applied, the dump mode is entered whenever impending wheel lock is detected, the regulation mode is entered when wheel recovery is detected, and, overriding dump and regulation modes, the hold mode is set when vehicle speed is at a low value during antilock activity.

The left-right coordination program 56 shown in FIG. 6, is executed for all axles where left and right brakes have independent control. The wheel that is first set at dump mode is identified as the wheel of low-$\mu$ side and the opposite wheel is assumed to be at the high-$\mu$ side. This program is executed by first testing for the dump mode <90>. If the control is not in dump mode the routine is bypassed. If it is in dump mode <90> and the opposite wheel is in power mode <94>, the slip S of the opposite wheel is obtained <96>, a wheel slip threshold $S_{th}$ is determined <98> and compared to the slip S <100>. When the slip is greater than the threshold the control for the opposite wheel is set to dump mode <102> before passing control to block 92. The effect of this algorithm is to force the opposite wheel into antilock operation, initially arrest any increase in the opposite pressure and likely to decease the opposite pressure for one or a few control loops until wheel recovery is detected in block 78 to cause entry into regulation mode. Thus the system is prepared for split-coefficient surface operation upon initial antilock operation and the left-right coordination function does not come into play again until a brake reapplication puts the brakes into power mode and impending slip is sensed.

Figure 7:
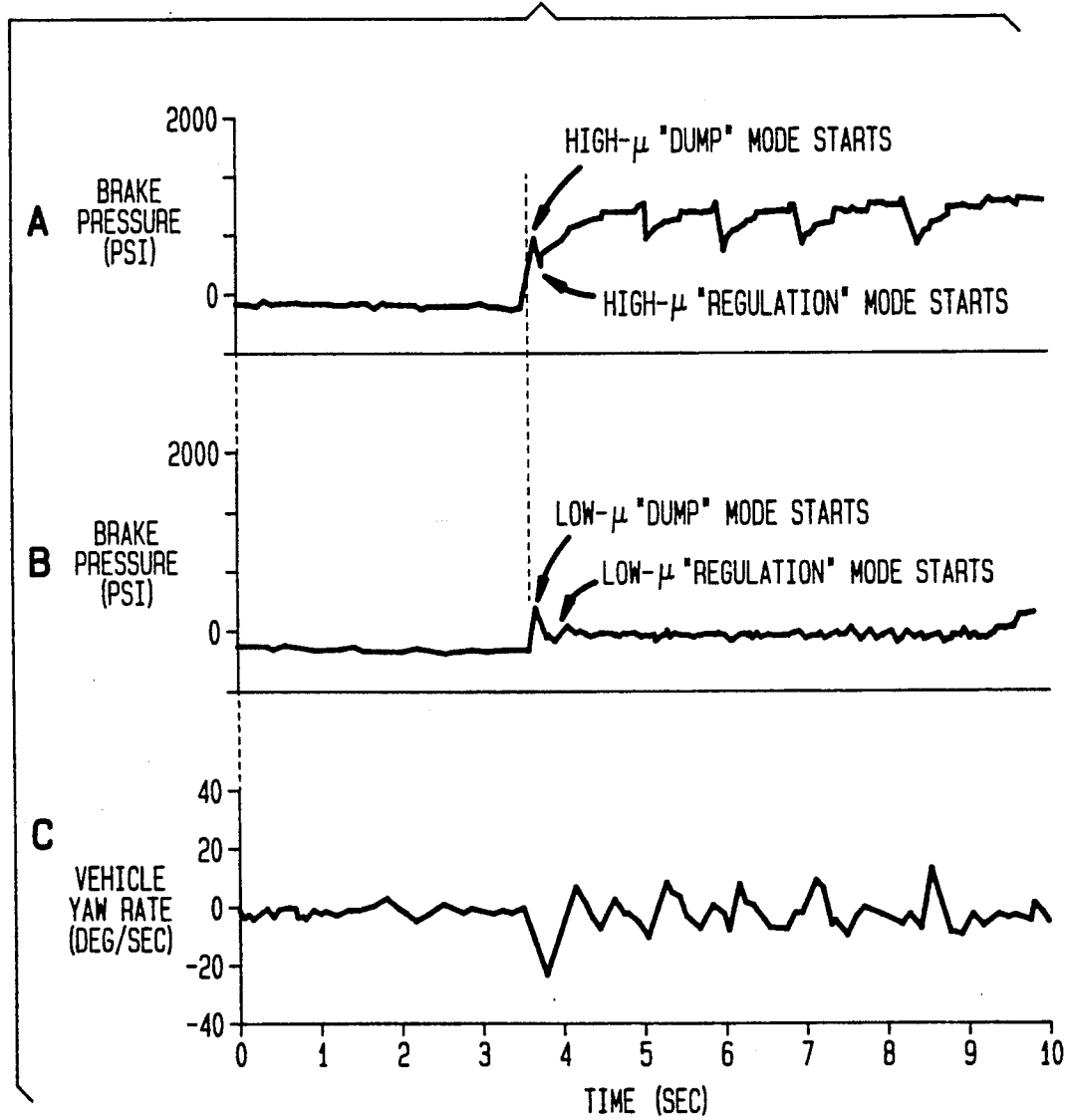
FIG. 7 is a graphical illustration of wheel brake pressures and vehicle yaw occurring during brake operation.

The graphs of FIG. 7 illustrate the effect of the coordination program 56. Graph A tracks the brake pressure on the high-$\mu$ wheel and graph B shows the brake pressure of the low-$\mu$ wheel. The first spike of pressure in both graphs occurs when brakes are first applied. The dump mode is triggered almost immediately in the low-$\mu$ side to cause a pressure drop followed by the beginning of the regulation mode which maintains the pressure at a very low value on the order of 100 psi. The coordination program 56 causes the pressure on the high-$\mu$ side to dump shortly after the low side dumps and prevent the initial pressure from becoming large. The high side wheel quickly recovers and enters the regulation mode which holds the maximum pressure to about 1000 psi. The high side alternates between the regulation and dump modes to cause wheel cycles having periods of about one second. Graph C depicts the vehicle yaw rate during the braking action. Upon initial braking, the yaw rate approaches −30 degrees/second. The rapid release of the high-$\mu$ wheel prevents a greater yaw rate. Thereafter, the yaw rate oscillates about a zero value and has peaks which are generally somewhat less than plus or minus 20 degrees/second. These yaw rate values are reasonably manageable by the vehicle operator.

The process of selecting the wheel-slip threshold $S_{th}$ required by block 98 is illustrated in FIG. 8. The wheel-slip threshold is a function of both vehicle speed v and deceleration. The speed component $S_V$ is a monotonically decreasing function of vehicle speed as shown in block 104. The function decreases with speed since a high yaw rate may be acceptable at a low vehicle speed and a lower yaw rate is preferred at higher speeds. The function may be stored as a formula or, preferably, as a table giving the $S_V$ value for several discrete speeds and using interpolation for intermediate speeds. The deceleration dependent component $S_D$ is a simple increasing curve as shown in block 106. This too, may be stored as a formula or as a table. It has a zero value when vehicle deceleration is below a certain value, and then increases with deceleration increase. This makes the threshold higher for high deceleration which would occur only on relatively high coefficient surfaces but the threshold is lower and the left-right coordination more sensitive to slip at low vehicle deceleration. As shown in block 108, the wheel-slip threshold $S_{th}$ is the sum of the components $S_V$ and $S_D$. The selection of the threshold $S_{th}$ and comparison with the wheel-slip of the high-$\mu$ wheel is a way of estimating the tendency of the vehicle to exceed a certain yaw rate and the dump mode command given in block 102 is in effect an indication of excess yaw rate. By proper selection of the threshold components the yaw rate can be limited to a desired value. The particular functions of the threshold components are determined empirically for a given vehicle to achieve a balance of comfort and drivability with stopping capability.

A specific example of lookup tables for the functions $S_V$ and $S_D$ are given in Tables 1 and 2.

TABLE 1

| speed (mph) | $S_V$ |
| --- | --- |
| 0 | 0.8 |
| 10 | 0.54 |
| 15 | 0.28 |
| 20+ | 0.02 |

TABLE 2

| decel (g) | $S_D$ |
| --- | --- |
| 0 | 0 |
| 0.125 | 0.005 |
| 0.250 | 0.015 |
| 0.375 | 0.030 |
| 0.500 | 0.045 |
| 0.625+ | 0.060 |

Thus the respective values of $S_D$ and $S_V$ change stepwise as the deceleration or speed increase from zero or if a higher resolution function is desired interpolation can be used to determine intermediate values.

As an alternative to the coordination program 56, if the vehicle is equipped with an optional yaw rate sensor 110, as shown in FIG. 1, the measured yaw rate can be compared with a threshold, which may be set at, say, 20 or 30 degrees/second, to directly assess the tendency to exceed a desirable yaw rate. The alternate coordination program 56' is shown in FIG. 9 wherein a split coefficient surface is detected by testing for dump mode <90'> and the opposite side in power mode <94'>. If the split coefficient is confirmed <94'> the yaw rate is read <96'> and compared with a threshold <100'>. If the yaw rate exceeds the threshold the opposite side is set to dump mode <102'>.

After the left-right coordination program 56 or 56' has been executed, the pressure control is executed for each wheel by the routine 58 as shown in FIG. 10. If the control for a given wheel is in power mode <120>, the command is that the master-cylinder pressure be fully applied to that wheel <122>. If the control is in regulation mode <124> a pulse width modulated pressure command is issued <126>. If the control is in the dump mode <128> a full dump command is issued <130>. If none of the above modes is set, the hold mode applies and the brake pressure is held at its present value, subject to master-cylinder pressure <132>.

It will thus be seen that the method and system described herein are effective to detect when a vehicle is being braked on a split coefficient surface and to control the antilock function in a way to avoid undesirable vehicle yaw rates.

The embodiments of the invention in which an exclusive property or privilege is claimed are defined as follows:

1. A method for controlling brake pressure applied to respective brakes of left and right wheels of an axle of a vehicle traveling over a road surface, the method comprising the steps of:

sensing vehicle speed;

sensing vehicle deceleration;

controlling the brake pressure applied to each of the left and right wheel brakes in accord with a power mode for full brake application;

calculating a value or slip between each of the left and right wheels and the road surface;

for each one of the left and right wheels, terminating the power mode and initiating a brake pressure dump mode for releasing brake pressure when the calculated value of slip of said one of the left and right wheels exceeds a respective slip threshold, sensing a wheel recovery condition in response to the release of brake pressure in the brake pressure dump mode, and initiating a brake regulation mode for increasing the brake pressure in response to the sensed wheel recovery condition;

sensing a split coefficient road surface condition by determining when the power mode has been terminated and the brake pressure dump mode initiated for one of the left and right wheels while the brake pressure is being applied in accord with the power mode to the brake of the other one of the left and right wheels;

computing a yaw slip threshold having a value that is a predetermined function of the sensed vehicle speed and vehicle deceleration, the yaw slip threshold having an inverse proportional relationship to vehicle speed and a direct proportional relationship to vehicle deceleration; and when a split coefficient road surface condition is sensed, terminating the power mode and initiating the brake pressure dump mode for said other one of the left and right wheels when the calculated value of slip of said other one of the left and right wheels becomes greater than the computer yaw slip threshold.

2. The method of claim 1 wherein the predetermined function of the sensed vehicle speed and vehicle deceleration is the sum of a vehicle speed slip component that is a predetermined monotonically decreasing function of the vehicle speed and a vehicle deceleration slip component that is a predetermined monotonically increasing function of the vehicle deceleration.

* * * * *